J. H. DOHNER.
COUPLING FOR TUBING.
APPLICATION FILED NOV. 24, 1919.
1,337,547.
Patented Apr. 20, 1920.
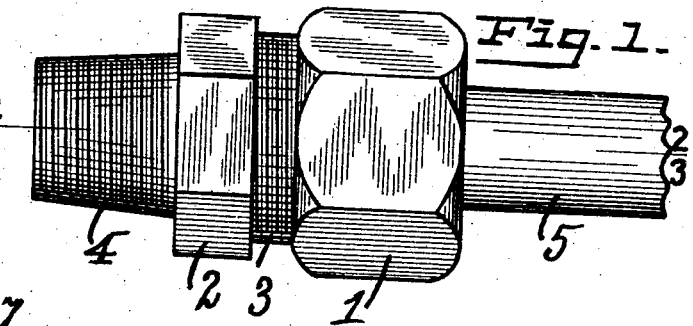
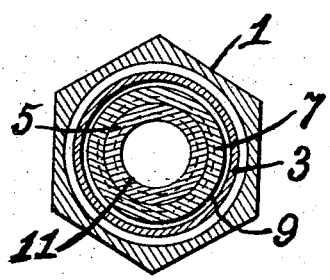
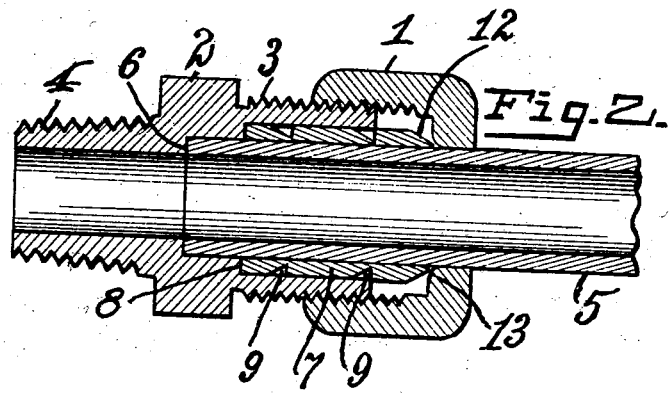
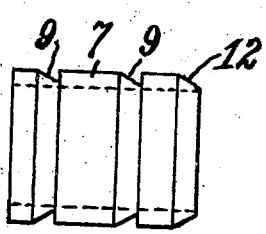
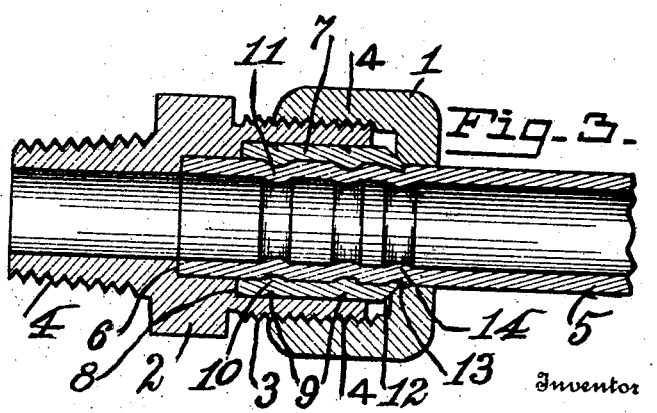

UNITED STATES PATENT OFFICE.

JOHN H. DOHNER, OF DAYTON, OHIO.

COUPLING FOR TUBING.

1,337,547.   Specification of Letters Patent.   Patented Apr. 20, 1920.

Application filed November 24, 1919. Serial No. 340,140.

*To all whom it may concern:*

Be it known that I, JOHN H. DOHNER, a citizen of the United States, residing at Dayton, in the county of Montgomery and State of Ohio, have invented certain new and useful Improvements in Couplings for Tubing, of which the following is a specification.

My invention relates to improvements in couplings for connecting tubing of softer metal than the coupling itself, such for example as copper or brass tubing. The present improvements relate specifically to the tube coupling patented by me June 24th, 1919, No. 1,307,540.

The object of the present invention is to provide the coupling with means for preventing the tubing from becoming loose through an excessive amount of vibration to which the coupling may be subjected under certain usage. This is accomplished through the means hereinafter described and claimed whereby the tube is gripped at the extreme end of the inner coupling sleeve as well as at other points as heretofore. This additional point of gripping contact between the coupling and the tube is adjacent to the end of the coupling, where the tube extends out, therefore, the said tube is firmly held against any lateral or side-wise movement where it is most liable to occur under constant vibration.

Preceding a more particular description reference is made to the accompanying drawings of which Figure 1 is an elevation of the coupling with a piece of tubing therein, broken off. Fig. 2 is a sectional view of the coupling on the line —2—2— before the inner coupling sleeve has been forced, under compression, into the tubing. Fig. 3, is a similar section on the line —3—3 of Fig. 1, after the parts of the coupling have been forced together to form the connection between the inner compression sleeve and the tubing. Fig. 4 is a section through the coupling on the line —4—4 of Fig. 3, and Fig. 5 is an elevation of the compression sleeve removed from the coupling.

In a more particular description of the invention similar reference characters indicate corresponding parts in the several views of the drawings.

The main parts of the coupling are a movable compression member —1— in the form of a cap nut, and a nipple —2— having a hollow screw-threaded extension —3— which the cap 1 engages, and an opposite screw threaded extension —4— which may be connected with any element, for example, screwed into a tank. As shown in the drawings the tubing —5— ends in the coupling, the inclosed end abutting against the annular shoulder —6— on the interior of the nipple —2—. In the event that the tubing to be coupled should not thus terminate in the coupling, it would necessarily pass through the coupling to the ultimate point of connection, and the nipple extension —4— and shoulder —6— would not be necessary in that particular part of the coupling. The cylindrical screw-threaded portion of the nipple —2— receives a compression sleeve —7— the end of which engages an annular shoulder —8— on the interior of said nipple. The outer surface of said sleeve —7— has two peripheral grooves —9— extending therearound. The features of the coupling thus far described are similar to the coupling as heretofore patented by me, and as shown, when the said sleeve —7— is compressed longitudinally by advancing the cap nut —1— on the nipple extension, interior beads —10— will form on the compression sleeve, and the copper tubing —5— being of softer metal, the said beads —10— will form and sink into corresponding grooves —11— in the said tubing. Such connection between the tubing and the sleeve —7—, under ordinary circumstances, is sufficient to hold the tubing firmly, but where the coupling or tubing is subjected to vibration a further gripping engagement between the compression sleeve and the tube is necessary, and it is essential that such engagement shall be at a point as near the end of the coupling as possible. To this end, therefore, the end of the compression sleeve —7— opposite that which engages the nipple, is formed with a taper —12— on the outer side of said end. On the inside of the cap nut —1— a corresponding taper —13— is formed around the opening through which the tubing extends. When the cap nut is forced against the end of the compression sleeve, the tapered end of the said sleeve will be forced into the copper tubing at that point, thus forming another indent —14— or engagement between the sleeve and the tubing, such being a third point of gripping contact between the compression sleeve and the tubing. When the cap nut —1— acts upon the sleeve to compress it or shorten its length, the tapered end thereof is forced into the tube as shown in Fig. 3, thus effecting a most durable and firm connection between the coupling and the tube.

Having described my invention, I claim:—

In a coupling for uniting tubing of ductile metal, the combination of coupling members having a screw-threaded engagement, one of said members having a tapered surface surrounding the tube opening, a compression sleeve of uniform internal diameter and having outer circumferential grooves and a tapered end inclosed within said coupling members, the tapered end engaging the tapered surface of one of said coupling members, said compression sleeve being adapted to embed itself in tubing at the points of said grooves and at the tapered end, when longitudinal force is exerted in said sleeve by the coupling members.

In testimony whereof I affix my signature.

JOHN H. DOHNER.